C. F. HOLDERMAN.
CUTTING OFF MACHINE.
APPLICATION FILED SEPT. 7, 1915.
1,305,108.
Patented May 27, 1919.
2 SHEETS—SHEET 1.
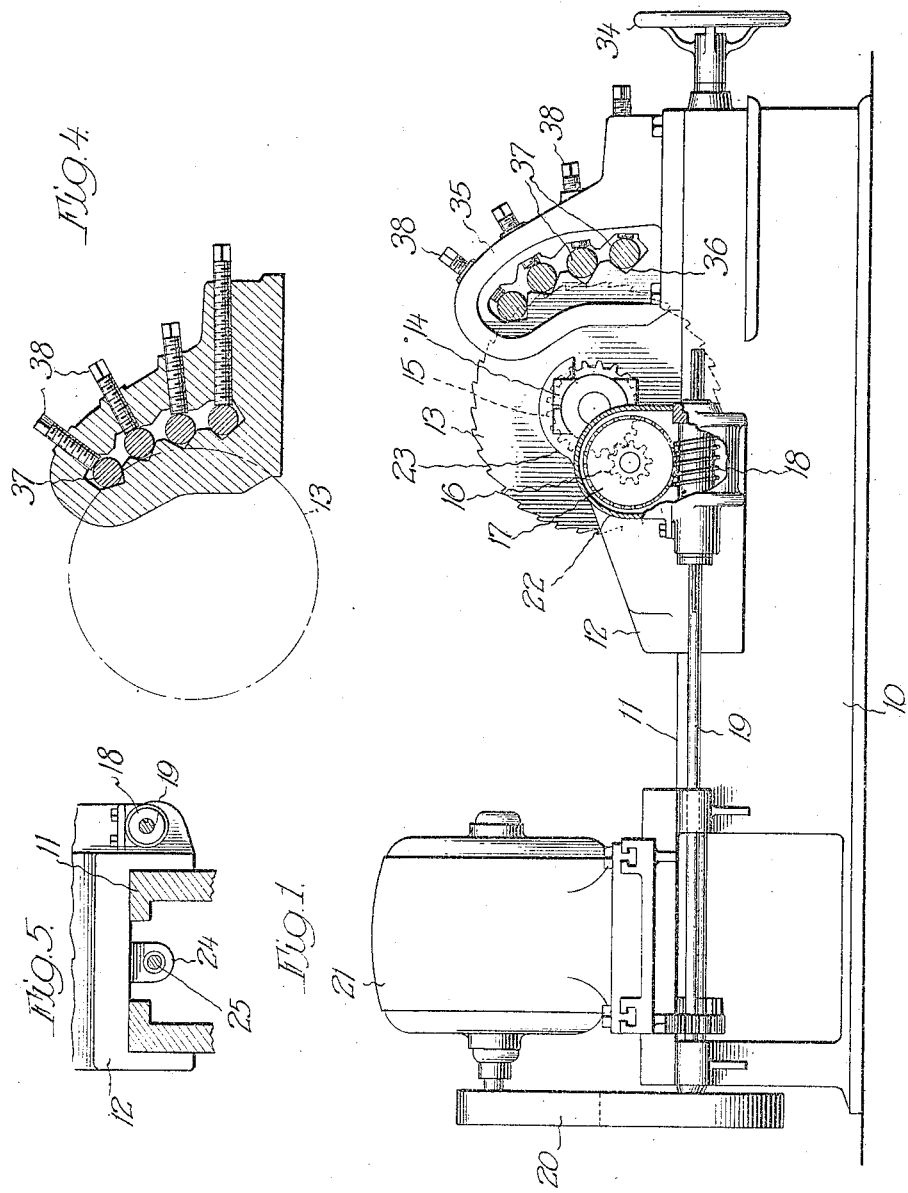

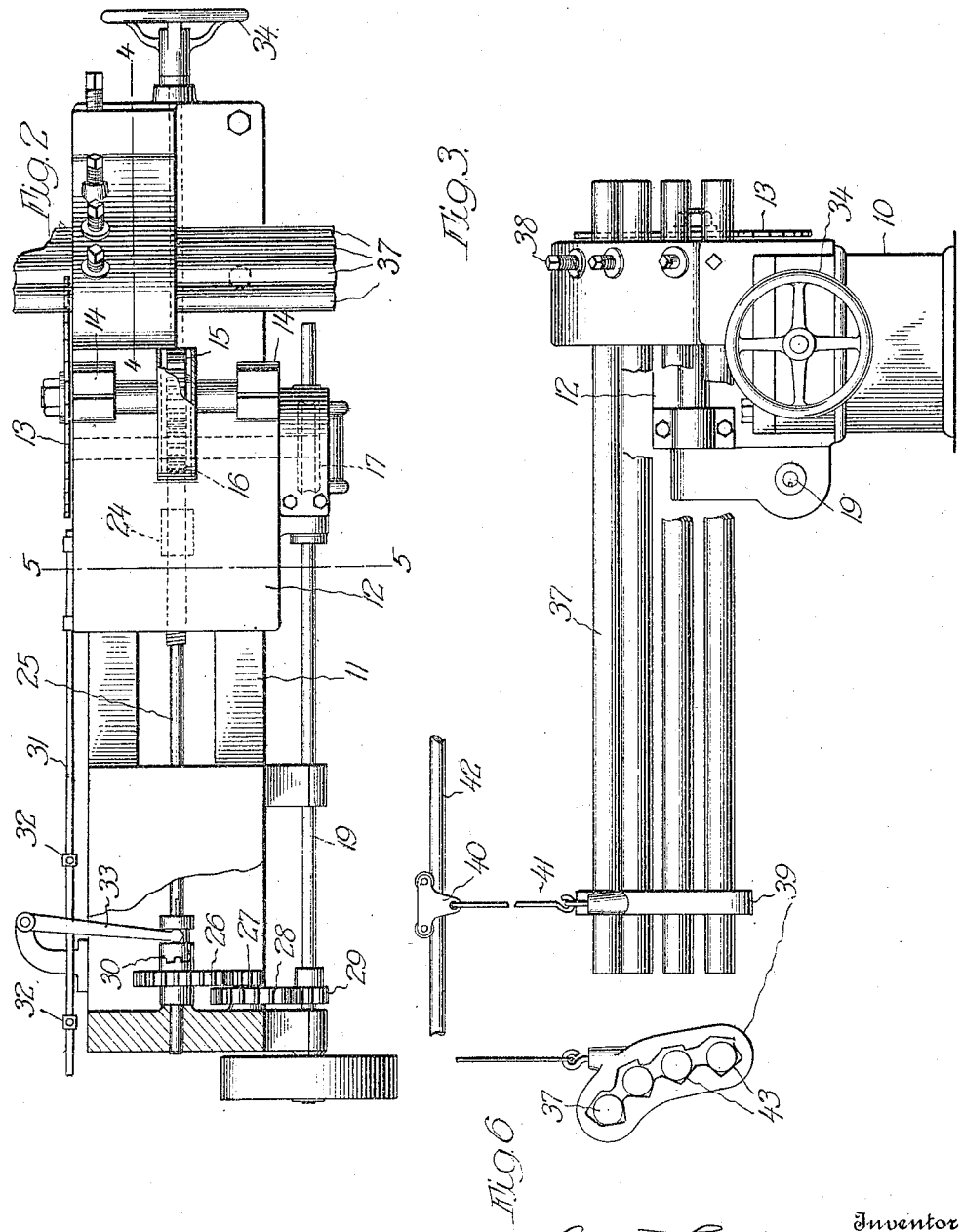

though the shaft 19 is driven by a belt from the motor 21 and may be thrown into or out of

UNITED STATES PATENT OFFICE.

CHARLES F. HOLDERMAN, OF DETROIT, MICHIGAN, ASSIGNOR TO PACKARD MOTOR CAR COMPANY, OF DETROIT, MICHIGAN, A CORPORATION OF MICHIGAN.

CUTTING-OFF MACHINE.

1,305,108.  Specification of Letters Patent.  Patented May 27, 1919.

Application filed September 7, 1915. Serial No. 49,229.

*To all whom it may concern:*

Be it known that I, CHARLES F. HOLDERMAN, a citizen of the United States, and resident of Detroit, Wayne county, State of Michigan, have invented certain new and useful Improvements in Cutting-Off Machines, of which the following is a specification.

This invention relates to cutting off machines or machines for sawing or cutting off short pieces from bar steel or other metal.

One of the objects of the invention is to provide a rigid support for the bars while being cut.

Another object of the invention is to provide rigid supporting means for one end of the bars and a traveling support for the other end so that the latter will, automatically move up toward the rigid support as the bars are brought forward for succeeding cuts.

Other objects will appear from the following description, taken in connection with the drawings, which form a part of this specification, and in which:

Figure 1 is a side elevation of a machine embodying the invention, parts being broken away;

Fig. 2 is a plan view of the machine shown in Fig. 1;

Fig. 3 is an end elevation looking from the right in Fig. 1;

Fig. 4 is a section on the line 4—4 of Fig. 2;

Fig. 5 is a section on the line 5—5 of Fig. 2; and

Fig. 6 is an end view of the bars and the traveling support, as seen from the left of Fig. 3.

10 represents the base or frame of the machine, and it is formed with suitable slides or ways 11, upon which the carriage 12 is adapted to slide longitudinally of the frame. A suitable cutting-off tool, such as a saw 13, is mounted to rotate in suitable bearings 14 on said carriage 12, and this saw is driven through suitable reduction gears 15, 16, 17 and 18, shaft 19, and belt and pulley 20 from a suitable motor 21, shown as an electric motor. It will be understood that the worm gear 18 is driven by the shaft 19 through a sliding key construction as will be seen best in Fig. 5. Thus, the movement of the carriage 12 on the frame will in no way interfere with the operation of the gear 18 through the shaft 19. Suitable casings 22 and 23 are arranged over the gears 17 and 15 respectively.

Extending downwardly from the carriage 12 is a lug 24 between the slideways 11, said lug being internally threaded and surrounding a threaded shaft 25 which is arranged longitudinally of the base of the machine and is driven through suitable reduction gears 26, 27, 28 and 29, from the rotating shaft 19. A clutch 30 permits the shaft 25 to be disconnected from the gear 26 to thereby stop the feed of the carriage 12. This clutch 30 may be operated by any suitable stop mechanism such as the rod 31 secured to the carriage 12 and having stops 32 coacting with the lever 33 mounted on the frame. The shaft 25 is also adapted to be operated by hand as through the hand wheel 34 for positioning the carriage 12 independently of the operating gearing.

Shown as mounted at the right hand end of the machine shown in Fig. 1 is a support for the bars to be operated upon. This support consists of a bracket 35 having a series of notches or seats 36 for the bars 37. This series of notches is arranged in the form of an arc of about the same radius as the saw or cutting-off tool 13, but the arc is slightly eccentric to the periphery of the saw so that the cutting edge of the latter as it moves forward comes opposite one of the notches slightly before it reaches the next adjacent notch. In this way, the saw does not operate simultaneously through the thickest part or greatest diameter of all of the bars.

As will be seen, the bracket 35 is provided with a binding screw 38 opposite each of the notches 36, so that the end of each of the bars 37 may be inserted in its respective notch and rigidly clamped therein by one of the screws 38. After the saw 13 has cut the desired length from the bars 37, it is retracted as by the hand wheel 34, and the bars are unclamped and moved out beyond the path of travel of the saw the desired distance for the succeeding cut. When again clamped, the saw again moves forwardly and makes another cut, beginning on the uppermost bar 37, and picking the others up successively.

For the purpose of supporting the free ends of the bars 37 and permitting of their being readily moved endwise after each cut to position them for the next cut, this invention provides a traveling support comprising a bracket 39 swung from a sliding block 40 by a cable or other suitable means 41. The block 40 slides or rolls on the track or bar 42, which is suitably supported above the bars 37. It will be seen that the bracket 39 is provided with suitable notches or openings 43 in the same relative positions to each other as are the notches 36 of the bracket 35, so that the bars 37 are held or supported in substantially parallel arrangement.

It is believed that the operation of the machine will be clearly understood from the above description. It will be understood also that but one form of the invention is shown herein, but various changes and alterations may be made without departing from the scope of the invention as set forth in the annexed claims.

Having thus described my invention what I claim and desire to secure by Letters Patent is:—

1. In a cutting-off machine, in combination, a rigid support for one end of a bar, means for cutting off the bar adjacent said support, and a support for the other end of the bar adapted to move with the bar and relatively to the rigid support and cutting-off means.

2. In a bar sawing machine, in combination, a saw, means for supporting the ends of a series of bars adjacent the saw, a traveling support for the other ends of the bars movable relatively to said means, and means for feeding the saw to the bars.

3. In a bar sawing machine, in combination, a saw, means for supporting the end of a bar adjacent the saw, a relatively traveling support for the other end of the bar, and means for operating and feeding the saw.

4. In a bar sawing machine, in combination, a circular saw and means for rotating it, means for supporting a series of bars in an arc in the path of the saw, so that one is in advance of the other a part only of its thickness during the entire sawing operation, and means for feeding the saw toward said bars.

In testimony whereof I affix my signature.

CHARLES F. HOLDERMAN.

Copies of this patent may be obtained for five cents each, by addressing the "Commissioner of Patents, Washington, D. C."